United States Patent [19]
Heiner et al.

[11] Patent Number: 6,020,655
[45] Date of Patent: Feb. 1, 2000

[54] CONTROL CIRCUIT FOR AN AIRBAG RELEASE UNIT

[75] Inventors: Heeren Heiner, Hauptstrasse; Jörn Rögner, Berliner Strasse, both of Germany

[73] Assignee: SICAN Gesellschaft fur Silizium-Anwendungen und CAD/CAT Niedersachsen mbH, Hannover, Germany

[21] Appl. No.: 09/141,604

[22] Filed: Aug. 28, 1998

[30] Foreign Application Priority Data

Aug. 28, 1997 [DE] Germany ............... 197 37 506

[51] Int. Cl.⁷ .................................................. B60L 1/00
[52] U.S. Cl. ............................................... 307/10.1
[58] Field of Search ................................ 180/274, 282; 280/728.1; 307/10.1

[56] References Cited

U.S. PATENT DOCUMENTS 5,856,710  1/1999  Baughman et al. ............... 307/10.1

FOREIGN PATENT DOCUMENTS 195 30586A1  2/1997  Germany .
195 30587A1  2/1997  Germany .
195 30588A1  2/1997  Germany .

*Primary Examiner*—Jeffrey Gaffin
*Assistant Examiner*—Roberto Rios Cvervas
*Attorney, Agent, or Firm*—Birch, Stewart, Kolasch & Birch, LLP

[57] ABSTRACT

An airbag control circuit comprises a transformer having a primary coil connected to a first sub-circuit and a secondary coil connected to a second sub-circuit, an ignition impedance for initiating deployment of the airbag, a first energy storage device connected to the secondary coil of the transformer, wherein the first sub-circuit transmits a first signal to the second sub-circuit via the transformer, and wherein the first signal charges the first energy storage device, a first sender/receiver unit connected to the secondary coil of the transformer and receiving the first signal, and a frequency analyzer connected to the first sender/receiver unit, wherein the frequency analyzer connects the first energy storage device to the ignition impedance in response to a predetermined change in a frequency of the first signal. The circuit further comprises a first gate in the second sub-circuit for releasing a second signal to the second coil, when the first signal is received for a predetermiened time and when the ignition impedence has a defined value.

15 Claims, 3 Drawing Sheets

CONTROL CIRCUIT FOR AN AIRBAG RELEASE UNIT

BACKGROUND OF THE INVENTION

1. Field of the Invention

The invention relates to a circuit for controlling the deployment of a safety cushioning device for occupants of a vehicle, often known as a passive restraint. More particularly, the circuit is for deploying an airbag within a steering wheel of an automobile.

2. Description of the Relevant Art

Control circuits for airbags are known from the German patent application DE-OS 195 39 070. The airbag system is located in the rotating part of the vehicle's steering wheel. A control device for activating an ignition impedance to release the airbag is located in a stationary part of the vehicle, e.g. in the steering column. The control information and the energy required for releasing the airbag is transmitted inductively by means of a transducer, such as a transformer. For providing an unintentional release, only a small energy amount is transmitted. A means for storing energy is provided in the steering wheel of the vehicle for storing sufficient energy for the ignition impedance. The means for storing energy can be for example a condenser.

A small power AC-signal is continuously transmitted to the device in the steering wheel, wherein the AC-signal is rectified and provides a constant energy supply. A trigger signal is sent for releasing the release unit, which trigger signal can be distinguished. from the AC-signal by a different frequency. The trigger signal is recognized by a control device switching a transistor for releasing the ignition impedance.

Further, the control circuit is controlling the charge state of the condenser and the function of the release unit. The resistance of the ignition impedance is measured for controlling the release unit. An error signal is send to the control device, if a defined value of the resistance is exceeded. Unfortunately, the error signal is not sent when a circuit failure in the steering wheel part of the circuit occurs, so that neither the circuit failure nor a failure of the ignition impedance is recognized.

In the German patent application DE-OS 195 30 586 Al a circuit for controlling the resistance of an ignition pill of an airbag is disclosed which is connected on the secondary side of a transformer. A failure of the airbag. function can be detected by a change in the resistance of the ignition pill. Therefore, the resistance is measured continuously and repeatedly for control. There is no unambiguous connection between the measured resistance and the resistance of the ignition pill, when the measurement is taking place at the primary coil of the transformer. It is proposed to connect an additional resistor in parallel to the ignition pill.

A further development of said circuit is described in the German patent application DE-OS 195 30 587 Al wherein a measurement resistor can be alternatively connected in addition to the ignition pill by use of a switch. The current at the primary side of the transformer is changing when said additional measurement resistor is connected to the ignition pill. The change in the current is required for functioning of an airbag and can be analyzed by a threshold gate.

In the German patent application DE-03 195 30 58 Al a further implementation of said circuit is described, wherein an impulse control charge is supplied to the primary side of the transformer for controlling the ignition impedance. The measurement is carried out by analyzing the rising and/or the falling time constant of the voltage being measured at the measurement resistor.

The problem in the above circuits is that the voltage which is measured is in conflict with the signals for controlling and releasing the airbag, when said signals are transmitted from the primary side to the secondary side of the transformer.

SUMMARY OF THE INVENTION

An object of the present invention is to provide an improved circuit for controlling a release unit of an airbag system, wherein the inventive circuit cures one or more of the drawbacks of the related art circuits.

The inventive circuit allows continuous monitoring of the portion of the circuit located in the steering wheel. The inventive circuit is relatively less expensive to manufacture and highly reliably. Further, the transmission of the information to and from the stationary part of the vehicle, e.g. the steering column, from and to the rotating part of the vehicle, e.g. the steering wheel, occurs without distortion or interruption with feedback transmissions of the information.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
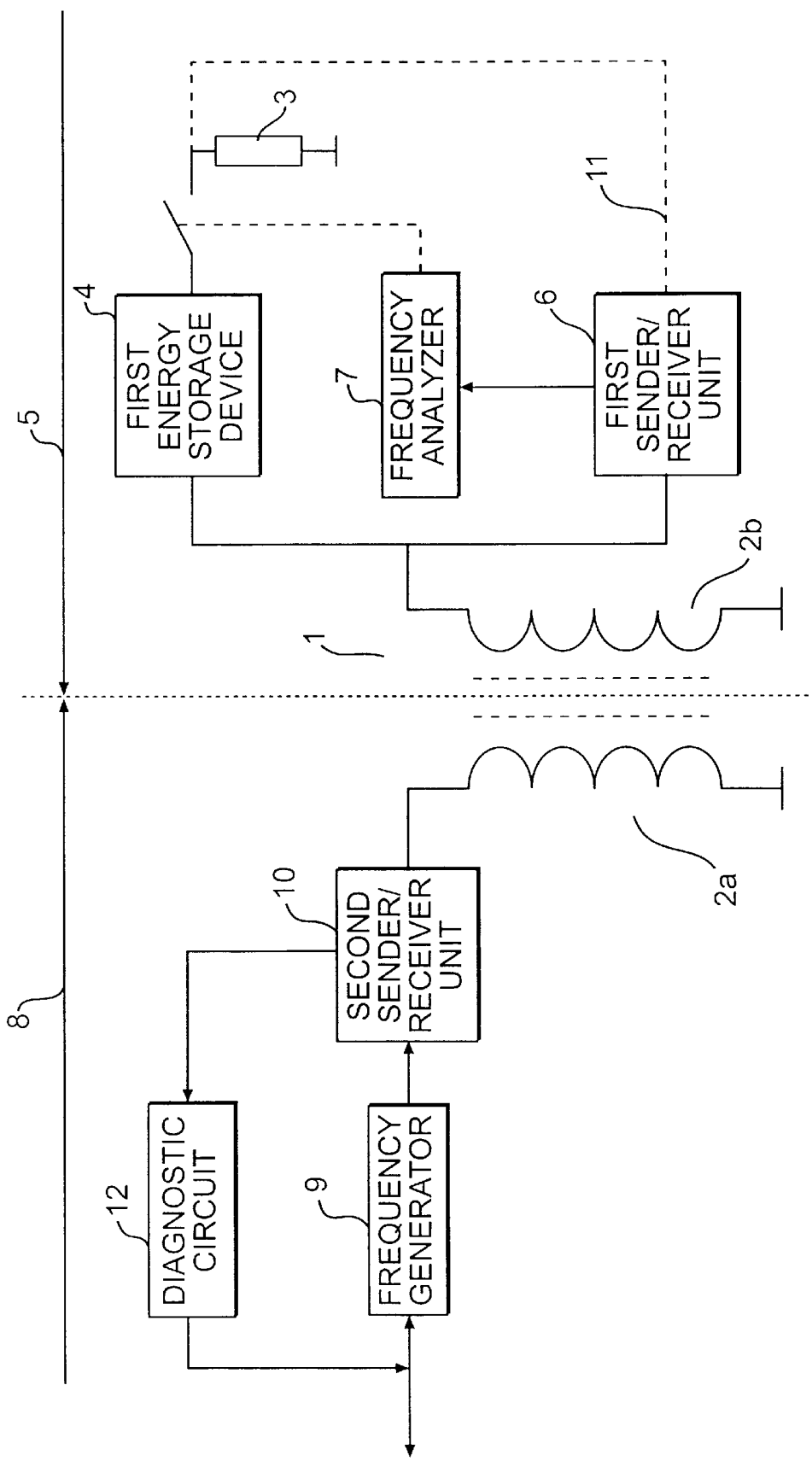
FIG. 1 is a block diagram illustrating the general operations of the control circuit, in accordance with the present invention.

FIG. 1 illustrates a circuit for controlling the deployment of a safety cushioning device for occupants of a vehicle, often known as a passive restraint. The circuit is particularly advantageous for deploying an airbag within a steering wheel of an automobile. A transducer, or transformer 1, is located inside a steering column adjacent to the end of the steering column where the steering wheel is attached thereto. The transformer 1 may be curved in shape, so as to encircle or partially encircle a steering shaft connected to the steering wheel.

The transformer 1 includes a primary side 8 having a primary winding or coil 2a, and a secondary side 5 having a secondary winding or coil 2b. An air gap exists between the primary coil 2a and the secondary coil 2b. The air gap allows the secondary coil 2b attached to the steering wheel to be freely rotated relative to the primary coil 2a attached to the steering column, yet allows electrical communication to be uninterrupted between the primary and secondary coils 2a, 2b.

A first sub-circuit is connected to the primary coil 2a. The first sub-circuit is located in the fixed portion of the steering column, or some other stationary portion of the vehicle. Primary features of the first sub-circuit are that it supplies control signals indicating when a deployment of the airbag is needed and monitors the functioning of a second sub-circuit. The second sub-circuit is connected to the secondary coil 2b. The second sub-circuit is located within the steering wheel. A primary feature of the second sub-circuit is that it monitors for the deployment control signal and causes deployment of the airbag in response thereto.

Now, with reference to FIG. 1, the general operation of the control circuit will be described. During normal operation, a weak alternating current (AC) signal is continually output by a frequency generator 9. The AC signal is communicated to a second sender/receiver unit 10, which in turn communicates the AC signal to the primary coil 2a. The AC signal is then communicated across the air gap of the transformer 1, from the primary coil 2a to the secondary coil 2b.

In the second sub-circuit, the AC signal is rectified and provided to a first energy storage device 4. The rectified AC signal maintains a predetermined charge within the first energy storage device 4. The rectified AC signal is also provided to a first sender/receiver unit 6. The first sender/receiver unit 6 is connected to a frequency analyzer 7, which monitors a carrier frequency of the AC signal.

When the frequency of the AC signal adopts a certain frequency, different from its normal frequency, the frequency analyzer 7 causes the first energy storage device 4 to be connected to an ignition impedance, in the form of an ignition resistor 3. The ignition resistor 3 is in contact with a gas propellant capable of expanding the airbag. When the charge stored in the first energy storage device 4 is connected to the ignition resistor 3, the airbag will be deployed.

The second sub-circuit also has the capability of sending a diagnostic signal 11 via the first sender/receiver unit 6 to the second sender/receiver unit 10. The diagnostic signal 11 is transmitted from the second sender/receiver unit 10 to a diagnostic circuit 12. The diagnostic circuit 12 analyzes the diagnostic signal 11 in order to monitor the functioning of the second sub-circuit, particularly the deployment of the airbag.

Figure 2:
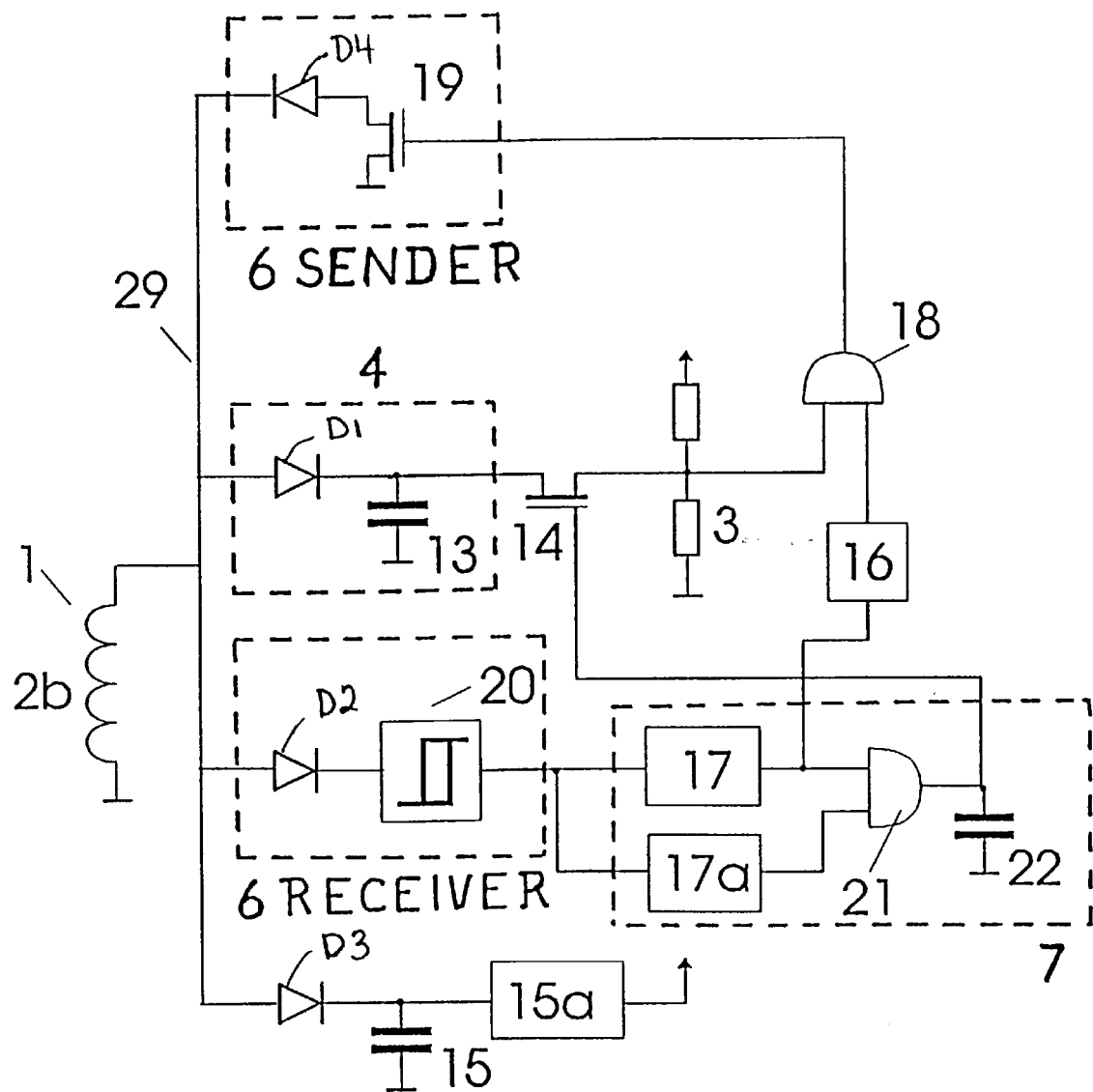
FIG. 2 is an electrical schematic illustrating a second sub-circuit located in a vehicle's steering wheel.

Now, the structure of the second sub-circuit will be described in greater detail with reference to FIG. 2. Diodes D1, D2 and D3 are provided to rectify the incoming AC signal. Although single diodes are illustrated it should be readily apparent that rectifying bridge arrangements could be employed.

The output of diode D1 is provided to the first energy storage device 4. The first energy storage device 4 may be in the form of a condenser, or capacitor 13. The rectified AC signal causes the capacitor 13 to be maintained in a charged state. The capacitor 13 is also connected to a first transistor 14. The first transistor 14 is connected to the ignition resistor 3. Normally, the first transistor 14 prevents current flow from the capacitor 13 to the ignition resistor 3.

The output of diode D2 is provided to a signal transducer 20. The output of signal transducer 20 is provided to two time function elements, such as timers 17 and 17a. The timers 17 and 17a are tuned so that their outputs are out of phase when the frequency of the AC signal is normal. In other words, the output of timer 17 is turned on when the output of timer 17a is turned off, and visa versa, when the AC signal has its normal frequency.

When the frequency of the AC signal takes on a different predetermined frequency, indicating that deployment of the airbag is needed, the outputs of the timers are no longer out of phase. The outputs of the timers 17 and 17a are connected to respective inputs of a gate, such as an AND gate 21. Therefore, when the AC signal exhibits the deployment frequency, the output of the AND gate 21 pulses high. The sequential high pulses of the AND gate 21's output cause a first condenser 22 to be charged. When the first condenser 22 is sufficiently charged, the first transistor 14 will allow current to flow from the capacitor 13 to the ignition resistor 3, thereby causing deployment of the airbag.

Now, the creation of the diagnostic signal 11 will be described. The output of one of the timers, such as timer 17, is connected to an integrator 16. Integrator 16 counts the time impulses, which are the output of timer 17, and outputs a signal when a predetermined number of time impulses have passed. The output of integrator 16 is connected to an input of a gate, such as AND gate 18.

Another input of AND gate 18 is connected to the ignition resistor 3, such that this input goes high when the first transistor 14 allows the charge stored in the capacitor 13 to be discharged through the ignition resistor 3. When both inputs to the AND gate 18 are high, i.e. the predetermined timer count has occurred and the first transistor 14 has been activated, the output of the AND gate 18 will go high. In other words the diagnostic signal 11 occurs.

The output of the AND gate 18 is connected to a second transistor 19. When the second transistor 19 is activated, a feedback signal 29 will be transmitted through the diode D4 to the secondary coil 2b. The feedback signal 29 is communicated from the secondary coil 2b to the primary coil 2a and used by the first sub-circuit as will be described in greater detail hereinafter.

The output of diode D3 is provided to a second energy storage device. The second energy storage device may be in the form of a condenser, or capacitor 15. The rectified AC signal causes the capacitor 15 to be maintained in a charged state. The capacitor 15 is also connected to a voltage regulator 15a. The voltage regulator 15a provides a positive voltage potential needed to operate the components of the second sub-circuit, such the timers 17 and 17a and the AND gates 21 and 18.

Figure 3:
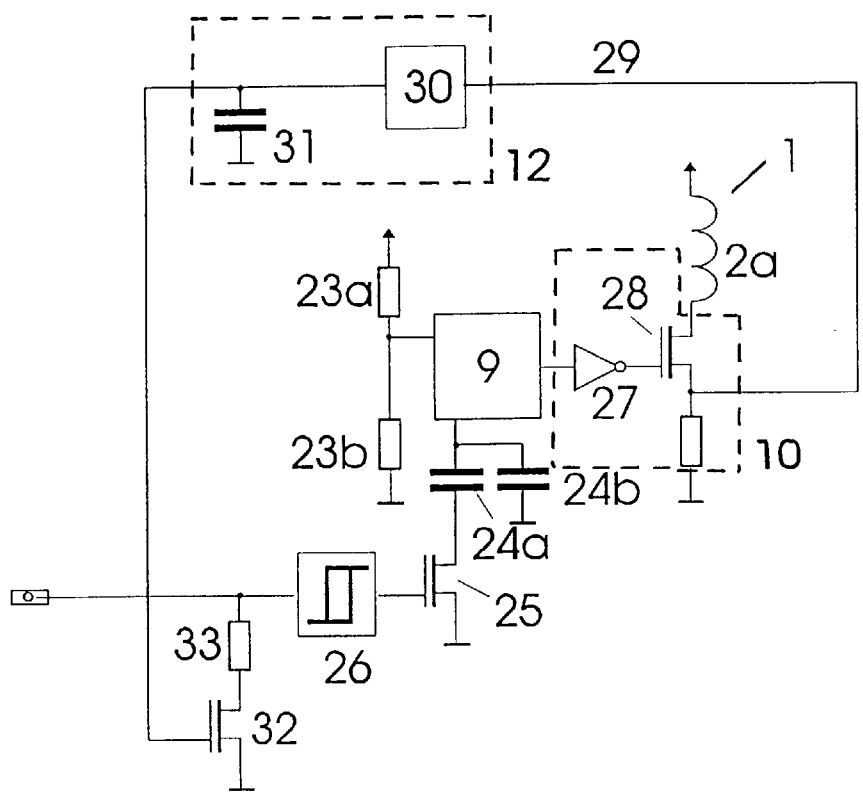
FIG. 3 is an electrical schematic illustrating a first sub-circuit located in a vehicle's steering column.

Now, the structure of the first sub-circuit will be described in greater detail with reference to FIG. 3. The AC signal, having a carrier signal of a particular frequency is produced by frequency generator 9. The frequency generator 9 includes external resistors 23a and 23b, as well as, external capacitors 24a and 24b. The external resistors 23a and 23b and the external capacitors 24a and 24b are used to set up a particular time constant for the frequency generator 9, so as to set a particular frequency.

External capacitor 24a can be electrically removed from the frequency generator 9 by switching transistor 25 removing the ground connection to capacitor 24a. Removal of the ground connection of capacitor 24a changes the time constant, and therefore the frequency, of the frequency generator 9. When capacitor 24a is electrically connected to ground, the frequency of the frequency generator 9 corresponds to a normal operating condition. When the capacitor 24a is electrically removed from ground, the frequency of the frequency generator 9 corresponds to a deployment condition, for example a higher frequency.

Of course, the normal frequency and deployment frequency can be reversed, wherein the addition of the capacitor 24a to the frequency generator 9 corresponds to a deployment condition. Also, the transistor 25 can be placed between the capacitor 24a and the frequency generator 9, instead of between the capacitor 24a and ground.

The output of the frequency generator 9 is not directly applied to the primary coil 2a of the transformer 1. Rather, the output of the frequency generator 9 is applied to a power drive circuit 27 and a third transistor 28, which in turn applies an AC signal to the primary coil 2a.

The feedback signal 29 sent by the second sub-circuit will be received across the primary coil 2a. This signal is fed to a current measurement circuit 30. The current measurement circuit 30 produces a pulsing signal for charging a condenser 31. The current at the condenser 31 decreases and a fourth transistor 32 is turned on, when the feedback signal 29 stops. When the fourth transistor 32 is turned on, current flows through a resistor 33, which results in an error signal being transmitted to an external electronic element. Also, the deployment condition is differentiated from the diagnostic signal by a comparing unit 26.

Now, with reference to FIG. 4, a modified control circuit for controlling additional parameters, in accordance with a further aspect of the invention, will be described. The control circuit has the ability of controlling other functions in the steering wheel in addition to deploying the air bag, and/or to control a more sophisticated, so-called intelligent air bag. Intelligent airbag systems can comprise several ignition resistors 46a and 46b, which can be individually controlled. Each ignition resistor 46a and 46b can have a respective energy storing device 47a and 47b.

Figure 4:
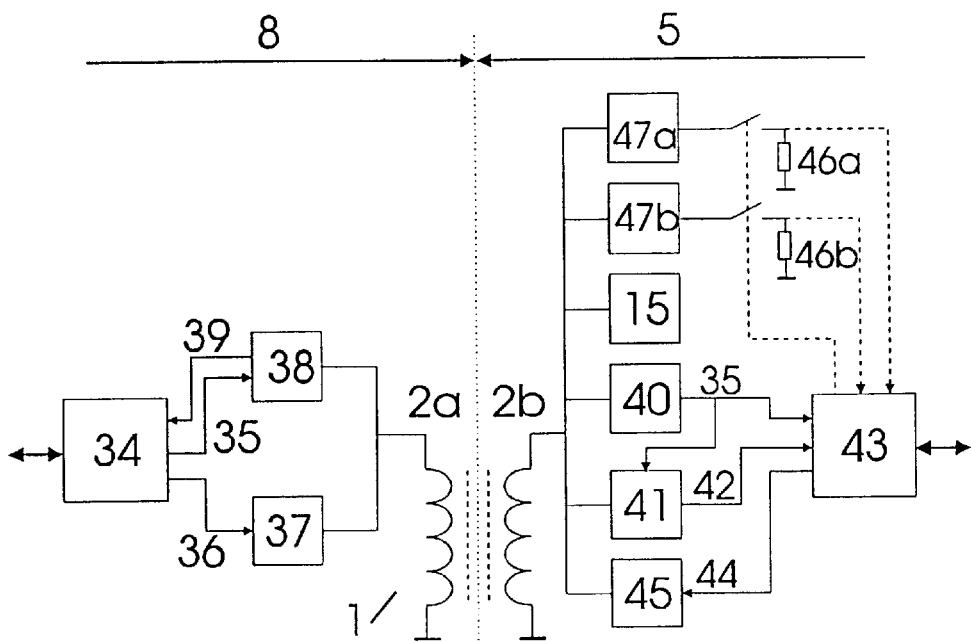
FIG. 4 is a block diagram illustrating a modified control circuit for controlling additional parameters, in accordance with a further aspect of the invention.

In the control circuit of FIG. 4, communication between the first sub-circuit and second sub-circuit is carried out by way of a half duplex method using a time shifted communication technique. A first micro controller 34 is provided in the first sub-circuit for producing a time stroke signal 35 and a carrier signal 36. The carrier signal 36 has a variable frequency range, such that frequency coded information can be transmitted by the carrier signal 36. For example, the carrier signal 36 can include two different frequency conditions for the transmission of digital information in the form of "0"'s and "1"'s, and a third frequency condition indicating that the airbag should be released.

The carrier signal 36 is supplied to a sender unit 37, which in turn applies the signal to the primary coil 2a during a transmitting period for the first sub-circuit. The signal is received by the secondary coil 2b, and used by the second sub-circuit to extract stroke, data and an energy supply for running the second sub-circuit. The extraction of the stroke takes place in a first circuit 40 and a data back extraction takes place in a second circuit 41 for analyzing the frequency states of the carrier signal 36. The data 42 are fed to a second micro controller 43, wherein the release frequency has total priority to the other frequencies, so that the airbag is immediately released. A sender unit 45 is provided for the data feedback transmission 44.

No carrier signal 36 is produced by the second sub-circuit during the transmitting period of the second sub-circuit. Rather, the signal of the second sub-circuit is received by the primary coil 2a and analyzed in a converter means 38 in order to produce a data stream 39 to be received by the first micro controller 34.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circuit for controlling deployment of an airbag, said circuit comprising:

a transformer having a primary coil connected to a first sub-circuit and a secondary coil connected to a second sub-circuit;

an ignition impedance for initiating deployment of the airbag;

a first energy storage device connected to said secondary coil of said transformer, wherein said first sub-circuit transmits a first signal to said second sub-circuit via said transformer, and wherein said first signal charges said first energy storage device;

a first sender/receiver unit connected to said secondary coil of said transformer and receiving said first signal;

a frequency analyzer connected to said first sender/receiver unit, said frequency analyzer connecting said first energy storage device to said ignition impedance in response to a predetermined change in a frequency of said first signal; and a first gate in said second sub-circuit for releasing a second signal to said secondary coil, when said first signal is received for a predetermined time and said ignition impedance has a defined value.

2. The circuit according to claim 1, further comprising:

a current measurement circuit in said first sub-circuit connected to said primary coil for detecting a failure of said first sub-circuit by detecting that a measured current is not exceeding a defined value in a defined time period.

3. The circuit according to claim 2, further comprising:

a condenser connected to an output of said current measuring circuit; and a transistor connected to said condenser, wherein said transistor is turned on when a power at the condenser drops below a defined value.

4. The circuit according to claim 2, wherein said frequency analyzer includes two time function elements, said time function elements being connected in parallel and having relatively differing timing characteristics; and a gate connected to outputs of said time function elements for comparing the output signals of the time function elements, wherein said first energy storage device is connected to said ignition impedance in response to the output signals of said time function elements overlapping.

5. The circuit according to claim 2, further comprising:

a second energy storage device, wherein said second energy storage device is connected to said secondary coil and is charged by said first signal, said second energy storage device providing a power supply for said first sub-circuit.

6. The circuit according to claim 3, further comprising:

a second energy storage device, wherein said second energy storage device is connected to said secondary coil and is charged by said first signal, said second energy storage device providing a power supply for said first sub-circuit.

7. The circuit according to claim 4, further comprising:

a second energy storage device, wherein said second energy storage device is connected to said secondary coil and is charged by said first signal, said second energy storage device providing a power supply for said first sub-circuit.

8. The circuit according to claim 2, wherein said first signal has two different frequencies states for transmitting digital information and has a third frequency state for initiating deployment of the airbag.

9. The circuit according to claim 3, wherein said first signal has two different frequencies states for transmitting digital information and has a third frequency state for initiating deployment of the airbag.

10. The circuit according to claim 4, wherein said first signal has two different frequencies states for transmitting digital information and has a third frequency state for initiating deployment of the airbag.

11. The circuit according to claim 1, wherein said predetermined change in frequency of said first signal is an increase in frequency from a first frequency to a second frequency.

12. The circuit according to claim 1, further comprising a rectifier electrically connected between said first energy storage device and said secondary coil.

13. The circuit according to claim 12, wherein said rectifier is a diode.

14. The circuit according to claim 1, wherein said ignition impedance is a resistor.

15. The circuit according to claim 1, wherein said first energy storage device is a capacitor.

* * * * *